US007463979B2

(12) United States Patent
King (10) Patent No.: US 7,463,979 B2
(45) Date of Patent: Dec. 9, 2008

(54) METHOD AND APPARATUS FOR INITIALIZING AN APPROXIMATE POSITION IN A GPS RECEIVER

(75) Inventor: Thomas M. King, Tempe, AZ (US)

(73) Assignee: Motorola, Inc., Libertyville, IL (US)

( * ) Notice: Subject to any disclaimer, the term of this patent is extended or adjusted under 35 U.S.C. 154(b) by 177 days.

(21) Appl. No.: 10/651,192

(22) Filed: Aug. 28, 2003

(65) Prior Publication Data

US 2005/0055160 A1    Mar. 10, 2005

(51) Int. Cl.
*G01C 21/00* (2006.01)
(52) U.S. Cl. .................. 701/213; 701/214; 342/357.12; 342/357.1; 342/357.06
(58) Field of Classification Search ................ 701/213, 701/214; 342/357.12, 357.1, 357.06; 455/456.1, 455/457
See application file for complete search history.

(56) References Cited

U.S. PATENT DOCUMENTS

| | | | |
|---|---|---|---|
| 4,445,118 A | | 4/1984 | Taylor et al. |
| 5,528,247 A | * | 6/1996 | Nonami ................... 342/357.1 |
| 5,874,914 A | | 2/1999 | Krasner |
| 6,208,290 B1 | | 3/2001 | Krasner |
| 6,211,819 B1 | | 4/2001 | King et al. |
| 6,421,002 B2 | | 7/2002 | Krasner |
| 6,429,809 B1 | * | 8/2002 | Vayanos et al. ......... 342/357.03 |
| 6,525,687 B2 | * | 2/2003 | Roy et al. ............... 342/357.06 |
| 6,650,288 B1 | * | 11/2003 | Pitt et al. ................ 342/357.15 |
| 6,757,610 B1 | * | 6/2004 | Mann et al. .................. 701/213 |
| 2003/0054759 A1 | * | 3/2003 | Da et al. .......................... 455/7 |
| 2004/0008139 A1 | * | 1/2004 | Stone et al. ................. 342/451 |
| 2005/0060091 A1 | * | 3/2005 | Garin et al. .................. 701/213 |

OTHER PUBLICATIONS

Goran M. Djuknic, Robert E. Ricton, "Geolocation and Assisted-GPS", Bell Laboratories, Lucent Technologies, 10 pages.
Z. Biac, G. Marshall, M. Moeglein, W. Riley, "The Qualcomm/SnapTrack Wireless-Assisted GPS Hybrid Positioning System and Results from Initial Commercial Deployments", SnapTrack, A Qualcomm Company, 7 pages.
"Snap Core Multimode GPS Core for Wireless Devices", SnapTrack A Qualcomm Company, 4 pages.
"3rd Generation Partnership Project; Technical Specification Group GSM/EDGE Radio Access Network; Location Services (LCS); Mobile Station (MS)—Serving Mobile Location Centre (SMLC) Radio Resource LCS Protocol (RRLP) (Release 1999)", 3GPP TS 04.31 V8.8.0 (Feb. 2002), Global System for Mobile Communications, 59 pages.

* cited by examiner

*Primary Examiner*—Khoi H. Tran
*Assistant Examiner*—Marie A Weiskopf
(74) *Attorney, Agent, or Firm*—Hisashi D. Watanabe (57) ABSTRACT

A method (200, 600) and an apparatus (700) for a wireless portable communication device (102) for determining coarse position information are provided. The wireless portable communication device (102) receives information about a plurality of visible satellites (106, 108, 110), and determines a coarse position of the wireless portable communication device (102) and uncertainty parameters expected at the coarse position, using the determined coarse position and uncertainties to acquire satellites.

25 Claims, 7 Drawing Sheets

METHOD AND APPARATUS FOR INITIALIZING AN APPROXIMATE POSITION IN A GPS RECEIVER

FIELD OF THE INVENTION

The present invention generally relates to a global positioning system receiver, more specifically to a method and an apparatus for determining an approximate position of the global positioning system receiver.

BACKGROUND OF THE INVENTION

Because the performance of the satellite-based global positioning system ("GPS") receiver continues to improve while the receiver size and price continue to decrease, many companies have engaged in developing an assisted GPS solution for mobile phones, or handsets, which requires handset hardware modification. GPS provides an affordable means to determine position, velocity, and time around the globe. The GPS satellite constellation is developed and maintained by the U.S. Department of Defense, but civilian access is guaranteed through an agreement with the Department of Transportation. GPS satellites transmit two carrier frequencies, however, typically only one is used by civilian receivers. From the perspective of these civilian receivers on the ground, GPS satellites transmit at 1575.42 MHz using code-division multiple-access ("CDMA") technique, which uses a direct-sequence spread-spectrum ("DS-SS") signal at 1.023 MHz, or 1.023 million chips per second, with a code period of one millisecond ("msec"). Each satellite's DS-SS signal is modulated by a 50 bit-per-second ("bps") navigation message that includes accurate time and coefficients, or ephemeris, to an equation that describes the satellite's position as a function of time. The receiver position, more precisely, its antenna position, determination is based upon time of arrival measurements, which is based upon measurements of the code phase of each satellite DS-SS signal at a particular measurement epoch.

The four main conventional GPS receiver functions are:
1) Measuring distance from the acquired satellites to the receiver by determining the pseudoranges, or code phases;
2) Extracting the time of arrival of the signal from the contents of the acquired satellite transmitted message;
3) Computing the position of the acquired satellites by evaluating the ephemeris data at the indicated time of arrival;
4) Calculating the position of the receiving antenna and the clock bias of the receiver by using the above data items.

Position errors are affected by any one or any combination of the satellite clock, satellite orbit, ephemeris prediction, ionospheric delay, tropospheric delay, and vary on the order of 5 to 30 meters depending on geometry and atmospheric conditions. Most of the error to single-frequency GPS users is from unmodeled delay variation due to ionospheric bending of the signal as it penetrates the atmosphere.

In addition to the task of shrinking the GPS antenna to fit a typical handset, a traditional autonomous GPS receiver chipset is difficult to embed in the handset for three main reasons. First, its start-up time, which is measured from turning on to the initial position fix, is relatively long due to its long acquisition time of the navigation message, typically at least 30 seconds but up to a few minutes. Second, it is unable to detect weak signals that result from indoor and urban canyon operations as well as small cellular sized antennas. Third, its power dissipation is relatively high per fix, primarily due to the long signal acquisition time in an unaided application. To overcome these problems, the assisted GPS method is used, in which the navigation messages are sent directly to the handset via an over-the-air message exchange with the cellular network as well as satellite signal acquisition aiding.

The basic idea of assisted GPS is to establish a GPS reference network, or a differentially-corrected wide-area GPS network, whose receivers have clear views of the sky and can operate continuously. This reference network is also connected with the cellular infrastructure, and continuously monitors the real-time constellation status and provides precise data such as satellite visibility, estimates of satellite signal Doppler shift due to satellite motion, and even the pseudorandom noise code phase at a particular location on the earth for each satellite at a particular epoch time. At the request of the handset or location-based application, the assist data derived from the GPS reference network are transmitted to the handset GPS sensor to aid fast start-up and to increase the sensor sensitivity by allowing the receiver to focus its search time where the signal is known to be. Acquisition time is reduced because the Doppler versus code phase uncertainty space is much smaller than in conventional GPS due to the fact that the search space has been predicted by the network. This allows for rapid search speed and for a much narrower signal search bandwidth, which enhances sensitivity over a pre-defined finite search time. Once the embedded GPS sensor acquires the available satellite signals, the pseudorange measurements can be delivered to network-based position determination entity ("PDE"), or can be used internally to compute position in the handset.

For classification, when the position is calculated at the network, it is called a network-based handset-assisted GPS solution or MS-Assisted, where MS refers to mobile station, which is also often referred as mobile phone or handset. When the position is calculated at the handset, it is called a network-assisted handset-based GPS solution, or MS-Based solution.

Additional assisted data, such as differential GPS corrections ("DGPS corrections"), approximate handset location or cell base station location, and other information such as the satellite ephemeris data and clock correction can be transmitted to the handset to improve the location accuracy, to decrease acquisition time, and to allow for handset-based position computation. DGPS corrections are created from measurements of the satellite-to-user range errors from a DGPS reference receiver that is located on a precisely known location. The DGPS corrections can then be sent to other mobile stations that are "near" the DGPS reference station, removing most of the tropospheric and ionospheric error sources in the signals, and enabling position solutions in the mobile to accuracy on the order of 1-3 meters. This accuracy is possible because the tropospheric and ionospheric range errors in single-frequency GPS receivers are highly correlated over relatively large local regions, and error measurements at one point are essentially the same at another point, as long as the distance between the two points, the mobile station and DGPS reference station in this example, is on the order of several hundred kilometers.

Other acquisition data sent to the handset may aid the receiver in synchronizing in time with the 50 bps data stream sent from each satellite so that the receiver processor of the handset can use longer coherent integration periods, thus aiding sensitivity. Significant amount of effort has been put into establishing cellular over-the-air standards for assisted GPS technology support in order to guarantee a particular level of performance and to enable correct interoperatability between different handset and network vendors. One example of the cellular over-the-air standard is published by the 3GPP Organizational Partners; specification number 3GPP TS04.31 v8.10.0, titled "3$^{rd}$ Generation Partnership Project, Technical Specification Group GSM/EDGE Radio Access Network, Location Services (LCS), Mobile Station (MS)—Serving Mobile Location Centre (SMLC) Radio Resource LCS Protocol (RRLP), Release 99".

Several schemes have been proposed in the standards which reduce the number of bits necessary to be exchanged between the handset and the network by using compression techniques such as transmitting only the changes to parameters instead of the raw parameters themselves. Other satellite systems could be used, such as the Russian GLONASS system or future Galileo system. Besides adding a GPS reference network and additional location determination units in the network, the mobile phone must embed, at a minimum, a GPS antenna and RF down converter circuits, as well as a provision for some form of digital signal processing software or dedicated hardware.

Despite the above classification of two assisted GPS solutions, their principles are the same. If the GPS receiver did not know its approximate location, it would not be able to determine the visible satellites, or estimate the range, which is used to predict the code phase, or to estimate Doppler frequency of these satellites. The GPS receiver then would have to search the entire code phase, which spans from 0 to 1023 chips, and frequency space, which spans from −4 kHz to +4 kHz, to locate the visible satellites. The relative movements between the satellites and receiver make the search even more time-consuming. Therefore, the time-to-first-fix ("TTFF") is one important parameter to evaluate the quality of a receiver. For autonomous GPS, the present state-of-the-art fix-time for an un-initialized GPS sensor is approximately 60 seconds. Clearly, this is unacceptable for certain applications such as E911. By transmitting assistance data over the cellular network, TTFF can be reduced to a few seconds, eliminating the need to demodulate the GPS transmitted signals, for which the data is transmitted at 50 bps for a minimum of 30 seconds to obtain all the satellite orbit coefficients called ephemeris. The search time reduction is achieved by significantly reducing the search window of the code phase and frequency space by sending measurements of these parameters to the handset from the network. The reduction in search space allows the receiver to spend its search time focusing on where the signal is expected to be, which in turn allows it to search at a much narrower bandwidth, hence increasing signal detection sensitivity.

MS-Assisted GPS

The MS-Assisted solution, which is a network-based handset-assisted solution, shifts the majority of the traditional GPS receiver functions to the network processor. This solution requires an antenna, RF section, and digital processor for making measurements by generating replica codes and correlating them with the received GPS signals. The network transmits a very short assistance message to the mobile station, or the handset, consisting of time, visible satellite list, satellite signal Doppler, and code phase, as well as relative or absolute data bit timing in the form of integer code phase and GPS bit number, and also includes code phase search window, which is the width of uncertainty of the code phase search, as well as optional parameters such as satellite elevation and azimuth angle. Integer code phase is an estimate of the number of integer milliseconds between the current time and the time of arrival of the next GPS 50 bps data bit transition and allows the receiver to synchronize with the data bit timing and to coherently integrate for 20 milliseconds ("msec") without having to search for bit-synchronization. Thus, the integer code phase parameter ranges between zero and 19 msec to cover up to one bit-time of the 50 bps modulated bit stream, each bit taking 20 msec to transmit. GPS bit number indicates the modulo-4 bit number presently being received on the ground, where each bit is numbered from the start of the GPS subframe, each subframe taking 6 seconds or comprising 300 data bits. The data bits are numbered zero to 299, but when the modulo function is applied, the bit-number data collapses to a range of zero to three. The three combined parameters of GPS bit number, integer code phase, and code phase can be combined to compute an estimate of the initial range to the satellite, where the GPS bit number covers some integer number of 20 msec bits propagating through space, the integer code phase covers an integer number of 1 msec time increments of propagation time, and code phase covers a fractional millisecond propagation time. When the three time parameters are added together and multiplied by the speed of light, it produces an estimate of the total range between the user's estimated position and the satellite.

The MS-Assist parameters help the embedded MS-Assisted GPS sensor reduce the GPS acquisition time considerably and directly acquire the signal with minimum search time. These assistance data are valid for a few minutes. The MS-Assisted handset accepts some or all of these parameters, acquires the GPS signals, then returns from the measured pseudorange, in the form of code phase, and Doppler measurements made by the GPS sensor to the network. The network then takes these measurements and computes the position of the MS-Assisted handset.

MS-Based GPS

The MS-Based solution, which is a network-assisted handset-based solution, maintains a fully functional GPS receiver in the handset, in which position is computed locally in the handset. This may be a preferred solution since many applications in the handset may require the position data for applications such as route-guidance, turn-by-turn navigation, etc. This solution requires the same functionality as described in MS-Assisted GPS, but has additional means for computing the positions of the satellites and ultimately the position of the handset. This additional handset function generally requires an increase in the handset's total memory in addition to an increase in the rate of instruction execution, often expresses in million instructions per second ("MIPS"). In the initial start-up scenario, significantly more data in the form of the precise satellite orbital elements, such as ephemeris, or its compressed equivalent, must be provided to the handset compared to the network-based handset-assisted case. In addition to the orbital elements, an approximate position assist is sent to the handset enabling it to predict the satellite Doppler, code phase, and data bit timing for each satellite to minimize the search space and to avoid searching the entire sky for each satellite. Typically, the MS-Based handset receives position of the cellular tower, in which it is communicating with the network, as its initial approximate position. For the case of ephemeris data transmitted to the handset, this data is valid for two to four hours or more and can be updated as necessary over time. Thus, once the handset has the data, subsequent updates are rare. One proposal includes using a broadcast channel to distribute this data efficiently to all handsets in a network. In summary, the MS-Based handset computes position internally, and returns the computed handset position to the network if necessary.

An alternative to using an approximate initial position of the handset delivered to the handset from the network, an MS-Based GPS receiver can use its last-known-fix to estimate satellite acquisition data such as the visible satellite list and corresponding Doppler, code phase, and bit-timing data using almanac or ephemeris data. However, the last-known-fix position may be many thousands of miles away under some circumstances such as an airline traveler carrying the handset in a shirt pocket while traveling. Although a large initial position error may not be fatal in determining the position of the handset, it will slow the detection and acquisition of satellites on the next fix attempt as the error in the initial position translates into a large Doppler, code phase, bit timing, and satellite visibility list error, making it difficult or slow to acquire those visible satellites. To avoid the large initial position error, essentially all cellular systems utilizing MS-Based handsets transmit an approximate position to the MS-Based handset using a position of a base station to which the MS-Based handset is currently registered as the approximate position of the MS-Based handset. The handset then uses the approximate position received from the base station to compute satellite visibilities, Doppler, code phase, and bit timing estimates and uses the approximate position as a "seed" position for a weighted least squares position solution using pseudoranges determined during the acquisition of the visible satellites.

DETAILED DESCRIPTION OF THE PREFERRED EMBODIMENTS

The present invention relates to a method and an apparatus for determining an approximate position of an MS-based global positioning system ("GPS") receiver. A first preferred embodiment of the present invention provides a method in a wireless portable communication device, such as a handset, for determining an approximate position of the wireless portable communication device based upon satellite information without first receiving location information of a base station, to which the wireless portable communication device is registered, as an initial approximate position of the wireless portable communication device. A second preferred embodiment of the present invention provides a method in a wireless portable communication device for determining uncertainty parameters for the wireless portable communication device based upon satellite information without first receiving location information of a base station, to which the wireless portable communication device is registered. A third preferred embodiment of the present invention provides an apparatus, preferably a wireless portable communication device such as a cellular telephone, configured to determine an approximate position of the apparatus based upon satellite information.

Figure 1:
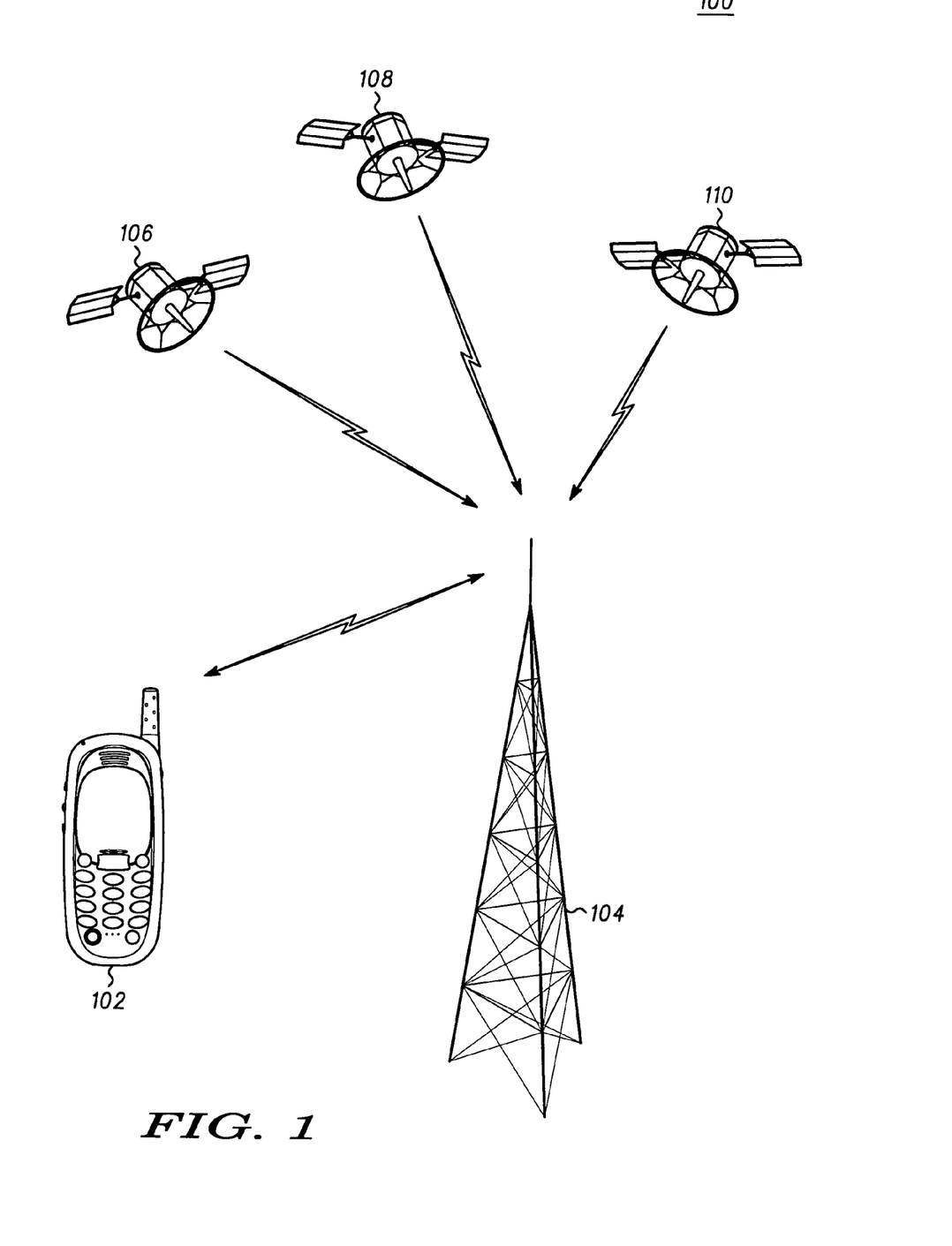
FIG. 1 is an exemplary block diagram of an environment where the present invention may be practiced.
Figure 2:
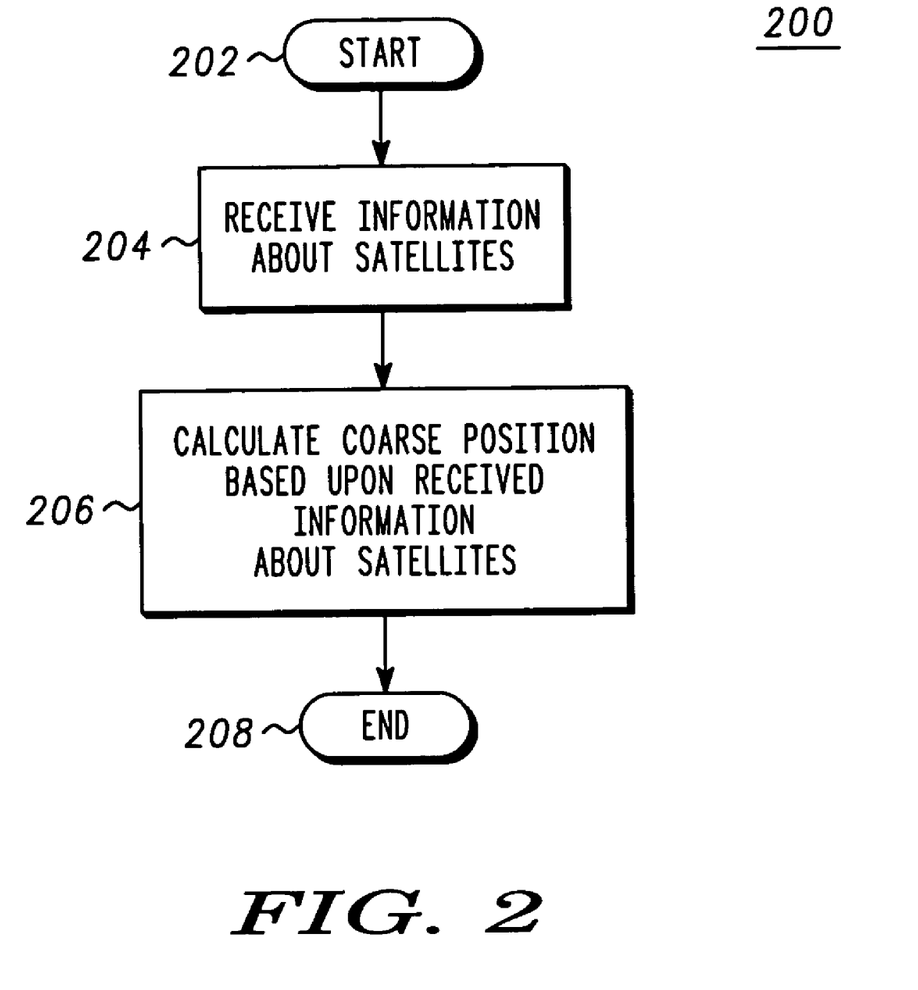
FIG. 2 is an exemplary flowchart of the first preferred embodiment in accordance with the present invention.

FIG. 1 is an exemplary block diagram 100 of an environment where the present invention may be practiced. In this environment, there are a wireless portable communication device 102, a base station 104, and a plurality of satellites, of which at least three satellites, 106, 108, and 110 that are visible from the base station 104 are shown. FIG. 2 illustrates an exemplary flowchart of a process of the first preferred embodiment of the present invention describing the method for determining an approximate position of the wireless portable communication device 102 involving the devices shown in FIG. 1.

The process begins in block 202. The wireless portable communication device 102 may initiate the process by requesting the base station 104 to transmit to the wireless communication device 102 information about the plurality of satellites. Alternatively, the base station 104 may initiate the process by transmitting the information about the plurality of satellites to the wireless portable communication device 102 upon the wireless portable communication device 102 registering to the base station 104. The wireless portable communication device 102 then receives the information about the plurality of satellites in block 204. The received information about the plurality of satellites comprises at least one of Doppler assist data, rate-of-change of Doppler data, code phase assist data, elevation angle data, azimuth angle data, integer code phase, and GPS bit number, associated with visible satellites. Each of these data includes corresponding data associated with at least three visible satellites. In this example, each data received includes corresponding data associated with the satellites 106, 108, and 110, and also indicates that the satellites 106, 108, and 110 are currently visible from the base station 104. Any one of the parameters, when considered over a population of N visible satellites, produces a set of N values for that parameter that are unique and different at every different location on the earth. Thus, each individual parameter, or group of parameters in the list of parameters including Doppler assist data, rate-of-change of Doppler data, code phase assist data, elevation angle data, azimuth angle data, integer code phase, and GPS bit number, can be used as a basis for estimating an approximate position on the earth of the mobile handset by computing or searching for the initial position on the earth that produces a match to the assist parameters sent to the handset from the network. The computation can be accomplished by an iterative least-squares estimator or by brute-force searching many locations, either of which selects the location with the best match or smallest composite difference between the computed parameters and the same parameters obtained from the network.

The wireless portable communication device 102 also contains orbital information such as ephemeris and almanac data of the plurality of satellites, which may be preloaded into the wireless portable communication device 102 at the time of production or sale of the wireless portable communication device 102. Alternatively, the wireless portable communication device 102 may receive the orbital information along with the information about the plurality of satellites it receives from the base station 104. Based upon the received information about the plurality of satellites, which identifies and provides relevant information about the visible satellites 106, 108 and 110, combined with the orbital information, the wireless portable communication device 102 calculates a coarse position of the wireless portable communication device 102 in block 206. The process then ends in block 208.

Figure 3:
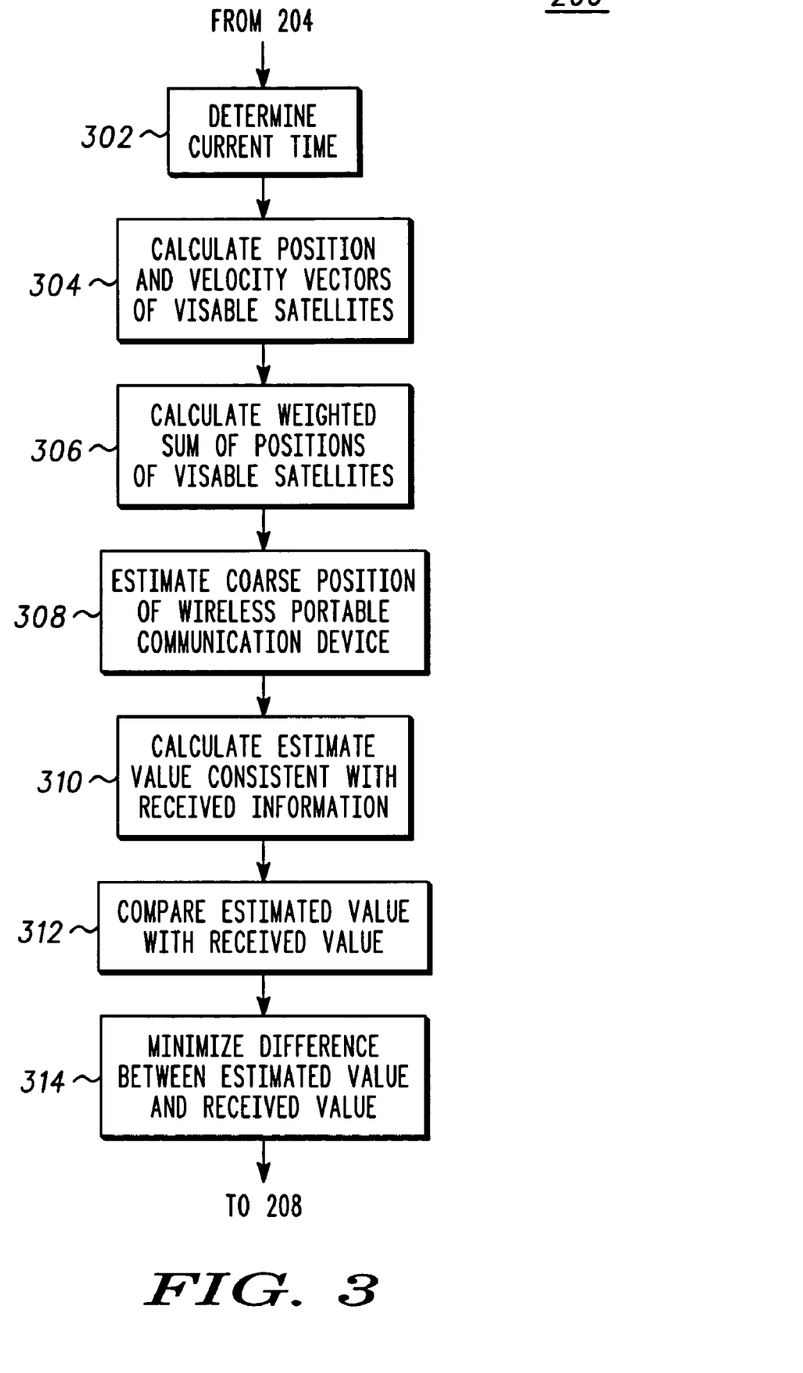
FIG. 3 is an exemplary flowchart further illustrating one of the blocks of FIG. 2.
Figure 4:
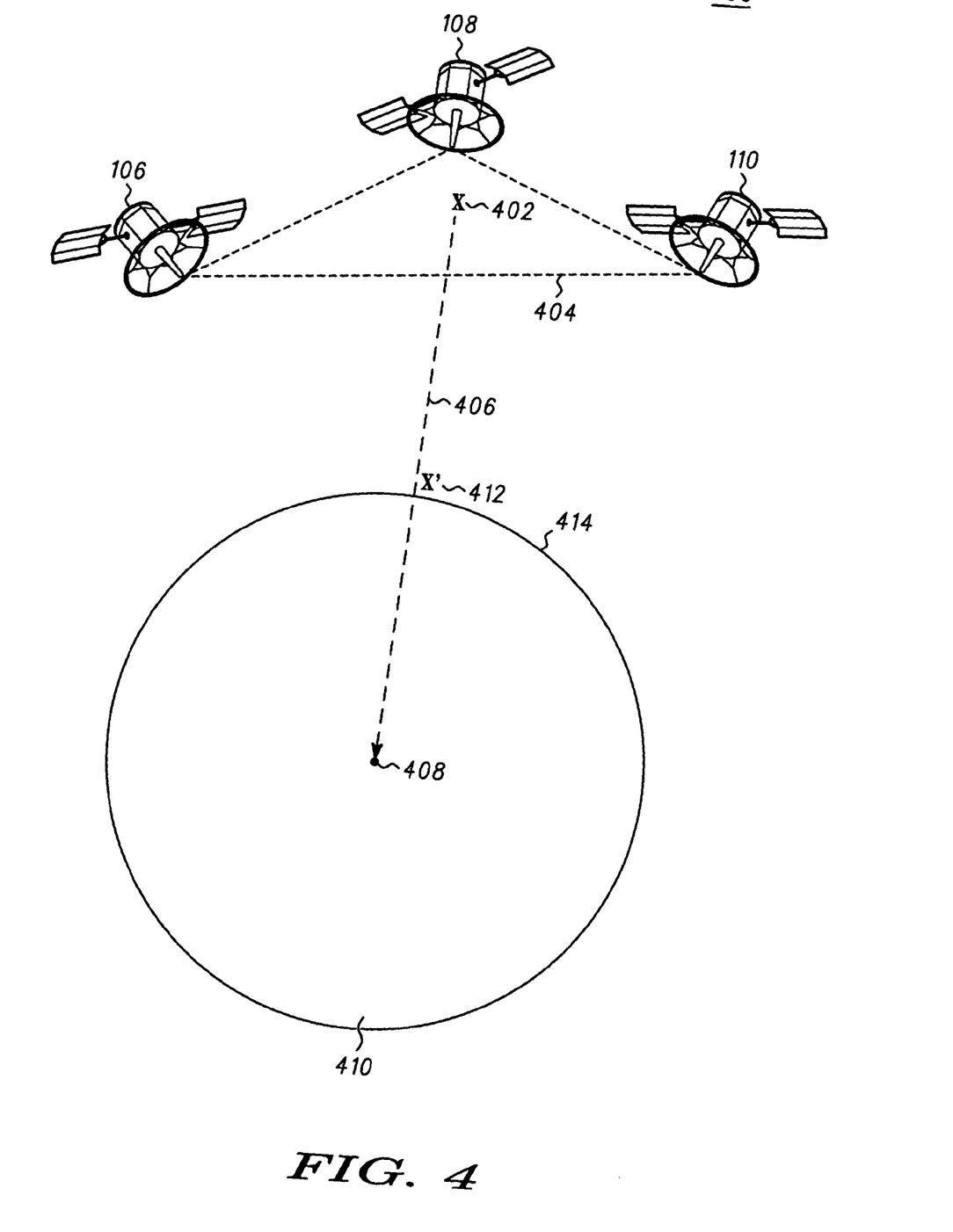
FIG. 4 is an exemplary block of coarse position estimation.

FIG. 3 is an exemplary flowchart further illustrating block 206 of FIG. 2. In block 302, the wireless portable communication device 102 determines the current time, which may be based upon its internal real time clock or may be based upon an over-the-air message such as information transmitted from the base station 104 and information obtained by demodulating one or more of transmitted data messages, each of which containing a time element, from the satellites 106, 108, and 110. In block 304, the wireless portable communication device 102 calculates position and velocity vectors of the visible satellites, 106, 108, and 110 based upon the current time and the orbital information, and in block 306, calculates a weighted sum of positions of the visible satellites 106, 108, and 110 based upon the calculated position vectors of the visible satellites 106, 108, and 110. The weighted sum of positions of the visible satellites 106, 108, and 108 may simply be an average position of the visible satellites 106, 108, and 108 if each position is weighted equally. However, under some conditions, it may be desirable to unequally weight the positions of the visible satellite, such as giving more weight to high elevation angle satellites over low elevation angle satellites if satellite elevation angle information is available. Then in block 308, the coarse position of the wireless portable communication device 102 is estimated based upon the weighted sum of positions of the visible satellites 106, 108, and 110, which is then translated or projected to the surface of the earth on a line between the weighted sum of positions of the visible satellites and the center of the earth. FIG. 4 illustrates an exemplary diagram 400 of the coarse position estimation. The weighted sum of positions of the visible satellites 106, 108, and 110 is first determined by calculating a centroid 402 of satellite positions for the visible satellites 106, 108, and 110, which in this example are weighted equally. Average positions are easily determined by computing averages of each axis of the earth-centered-earth-fixed coordinates for the satellites. For example, the X-axis average position is based on the average of the X-axis coordinates for all of the satellites. The Y-axis and Z-axis averages are computed the same way. In effect, the centroid 402 of a triangle 404 formed by the position vectors of the visible satellites 106, 108, and 110 produces the average position 402 of the visible satellites 106, 108, and 110. When more than three satellites are included in the weighted sum of positions, the weighted sum of positions is formed the same way but the surface is obviously no longer a triangle. Then the weighted sum of positions 402 is projected on a line 406 between the weighted sum of positions 402 and the center 408 of the earth 410 to a point 412 on the surface 414 of the earth 410 where the line 406 intersects the surface 414 of the earth 410 is taken as the estimated coarse position 412 of the wireless portable communication device 102.

Referring now back to FIG. 3, in block 310, based upon at least one of the calculated velocity vectors and the calculated position vectors, the wireless portable communication device 102 calculates an estimate value that is consistent with the received information from the base station 104 for each of the visible satellites 106, 108, and 110 at the estimated coarse position 412 of the wireless portable communication device 102. Then in block 312, the wireless portable communication device 102 calculates residuals, which are based upon differences between the estimated values and corresponding values in the received information for the visible satellites 106, 108, and 110. As previously described, the received information comprises at least one of Doppler assist data, rate-of-change of Doppler data, code phase assist data, elevation angle data, azimuth angle data, integer code phase, and GPS bit number associated with the visible satellites 106, 108, and 110. For example, if the wireless portable communication device 102 had received Doppler assist data in block 204, then the wireless portable communication device 102 would calculate Doppler assist data for the visible satellites 106, 108, and 110 expected at the estimated coarse position 410 at the current time, and then calculates the residual between the calculated Doppler assist data and the received Doppler assist data. The wireless portable communication device 102 minimizes the residuals in block 314. Block 314 can be accomplished by several methods, including a linearized least-squares solution that iteratively adjusts the estimated coarse position 412 based on the residuals computed. New residuals are computed on each iteration. Another method includes an iterative sequential search, starting at the projected weighted sum of positions determined in step 308 and trying positions offset in some pre-determined pattern such as 1 degree latitude and longitude increments. At each increment that is N integer degree offsets from the initial latitude and M integer degree offsets from the initial longitude, the process re-computes the estimated parameters at the new estimated position, re-computes the residuals, and then selects the estimated position iteration, that is, N and M that produce the lowest summed squared residuals. N and M can be positive as well as negative to cover a larger area surrounding the initially computed weighted sum of positions in block 308. Once determined, the process moves on to block 208.

Figure 5:
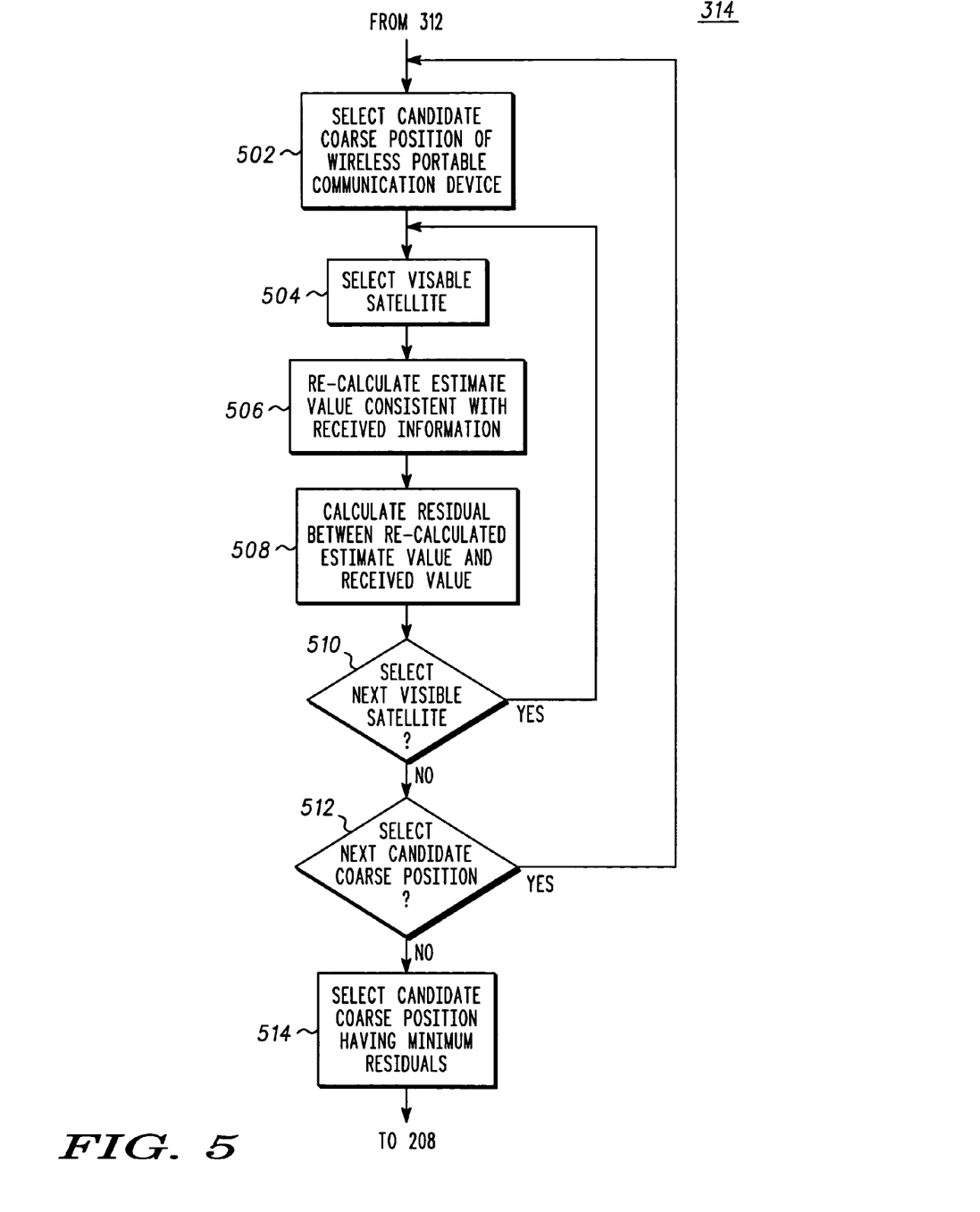
FIG. 5 is an exemplary flowchart further illustrating one of the blocks of FIG. 3.

FIG. 5 is an exemplary flowchart further illustrating block 314 of FIG. 3. After the first residuals are calculated in block 312, the wireless portable communication device 102 selects a candidate coarse position by varying the estimated coarse position 410 found in block 308 according to a predetermined condition in block 502. For example, the candidate coarse position may be offset relative to the estimated coarse position, within a pre-fixed range, by a predetermined increment such as one degree in longitude then by one degree in latitude. The wireless portable communication device 102 selects one of the visible satellites 106, 108, and 110 in block 504, and based upon at least one of the calculated velocity vectors, the calculated position vectors, or the current time, recalculates the estimate value expected at the selected candidate coarse position that is consistent with the received information for the selected visible satellite in block 506. The in block 508, the wireless portable communication device 102 calculates the residual between the recalculated estimate value and the corresponding value in the received information for the selected visible satellite. For example, in block 502, the wireless portable communication device 102 selects a candidate coarse position that is shifted in longitude by one degree from the estimated coarse position 412, and then selects the visible satellite 106 in block 504. The wireless portable communication device 102 then calculates Doppler assist data expected at the candidate coarse position for the visible satellite 106 in block 506, and calculates a residual between the calculated Doppler assist data expected at the candidate coarse position for the visible satellite 106 and the Doppler assist data for the visible satellite 106 in the received information in block 508. In block 510, the wireless portable communication device 102 checks whether there is a visible satellite still to be selected for the candidate coarse position currently used, and if there is, then the wireless portable communication device 102 repeats the process from block 504. If there are no more visible satellites for the candidate coarse position currently used, then the portable communication device 102 determines whether to select a next candidate coarse position in block 512. If all candidate coarse positions have not been processed, then the portable communication device 102 repeats the process from block 502. If all candidate coarse positions have been processed, then the portable communication device 102 selects the candidate coarse position having the least total sum-of-squares of the satellite residuals as the approximate position of the wireless portable communication device 102 in block 514. Alternatively, the wireless portable communication device 102 may select the candidate coarse position, which meets threshold values for the residuals, as the approximate position of the wireless portable communication device 102.

Figure 6:
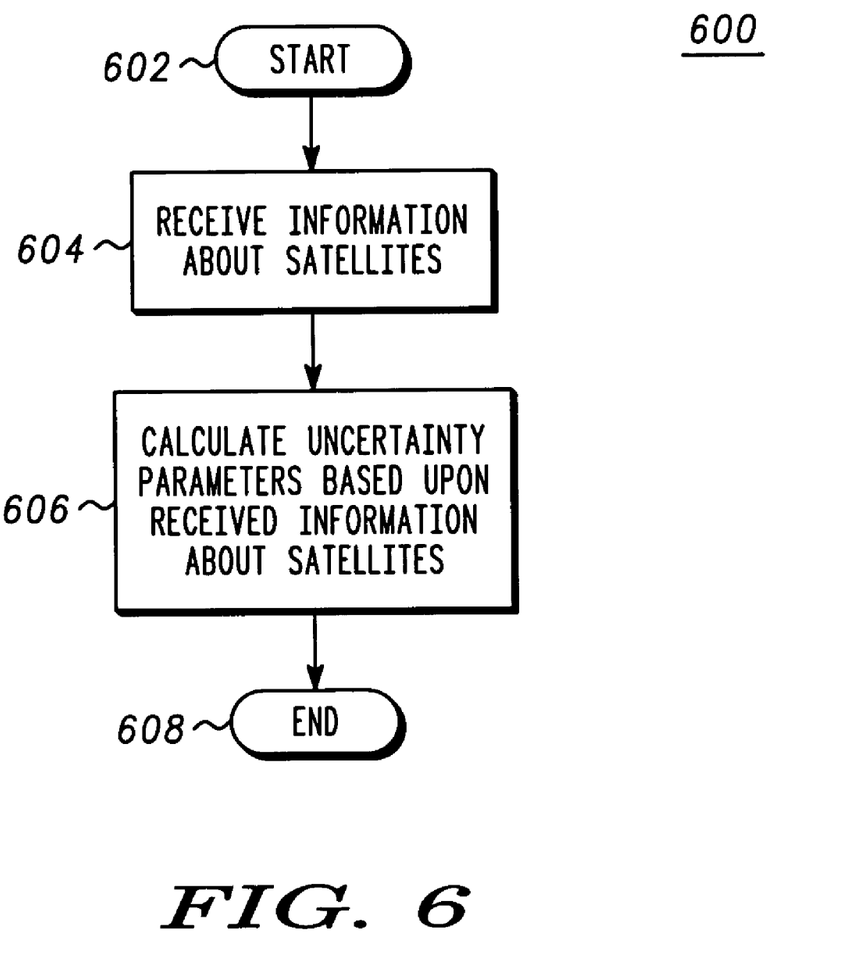
FIG. 6 is an exemplary flowchart of the second preferred embodiment in accordance with the present invention.

FIG. 6 illustrates an exemplary flowchart 600 of a process of the second preferred embodiment of the present invention describing the method for determining uncertainty parameters for the wireless portable communication device 102. The process for determining the uncertainty parameters of the wireless portable communication device 102 is similar to the process for determining an approximate position of the wireless portable communication device 102 as previously described for the first embodiment of the present invention. The process begins in block 602, and the wireless portable communication device 102 then receives the information about the plurality of satellites in block 604. As in the first embodiment, the wireless portable communication device 102 may initiate the process, or the base station 104 may initiate the process upon the wireless portable communication device 102 registering to the base station 104. As in the first embodiment, the received information about the plurality of satellites comprises at least one of Doppler assist data, rate-of-change of Doppler data, code phase assist data, elevation angle data, azimuth angle data, integer code phase, and GPS bit number, associated with at least three visible satellites. The wireless portable communication device 102 also contains orbital information such as ephemeris and almanac data of the plurality of satellites, which may be preloaded into the wireless portable communication device 102 at the time of production or sale of the wireless portable communication device 102. Alternatively, the wireless portable communication device 102 may receive the orbital information along with the information about the plurality of satellites. Based upon the received information about the plurality of satellites, which identifies and provides relevant information about the visible satellites 106, 108 and 110, combined with the orbital information, the wireless portable communication device 102 calculates uncertainty parameters for the wireless portable communication device 102 in block 606. The process then ends in block 608.

The process first follows the steps of the first embodiment in FIGS. 3, 4, and 5 in determining a coarse position of the wireless portable communication device 102. However, once the coarse position is determined, the wireless portable communication device 102 further calculates uncertainty parameters, such as but not limited to Doppler uncertainties and code phase uncertainties, expected at the coarse position, which has been found in block 514 to have the minimum residuals, based upon the current time, the coarse position, and orbital information of the visible satellites. The method of computation of uncertainty parameters for Doppler, code phase, and others is known in the art, and is detailed in a paper written by Smith and Graves entitled "Sensitivity of GPS Acquisitions to Initial Data Uncertainties", published by Institute of Navigation, describes the detailed method of computing Doppler sensitivity for each satellite, that is, the change in predicted Doppler frequency per unit change in position. The Doppler uncertainty is simply the product of Doppler sensitivity to position error multiplied by the estimated position uncertainty. This paper goes through the derivation of the specific equations to compute Doppler sensitivity for each satellite and points out that Doppler sensitivity is at most, about 1 Hz per km of position error. Thus, a 100 km position uncertainty would translate to a maximum of 100 Hz Doppler uncertainty. This is a maximum rule of thumb that has been applied to GPS receiver design for many years. However, the specific equations described by Smith and Graves can be used to compute the precise Doppler sensitivity for each satellite in the constellation, each of which is less than the value prescribed by the 1 Hz per km maximum rule of thumb value. By using the Smith/Graves equation, one can compute the Doppler sensitivity to position uncertainty for each satellite, and then compute the Doppler uncertainty as the product of Doppler sensitivity multiplied by position uncertainty.

Figure 7:
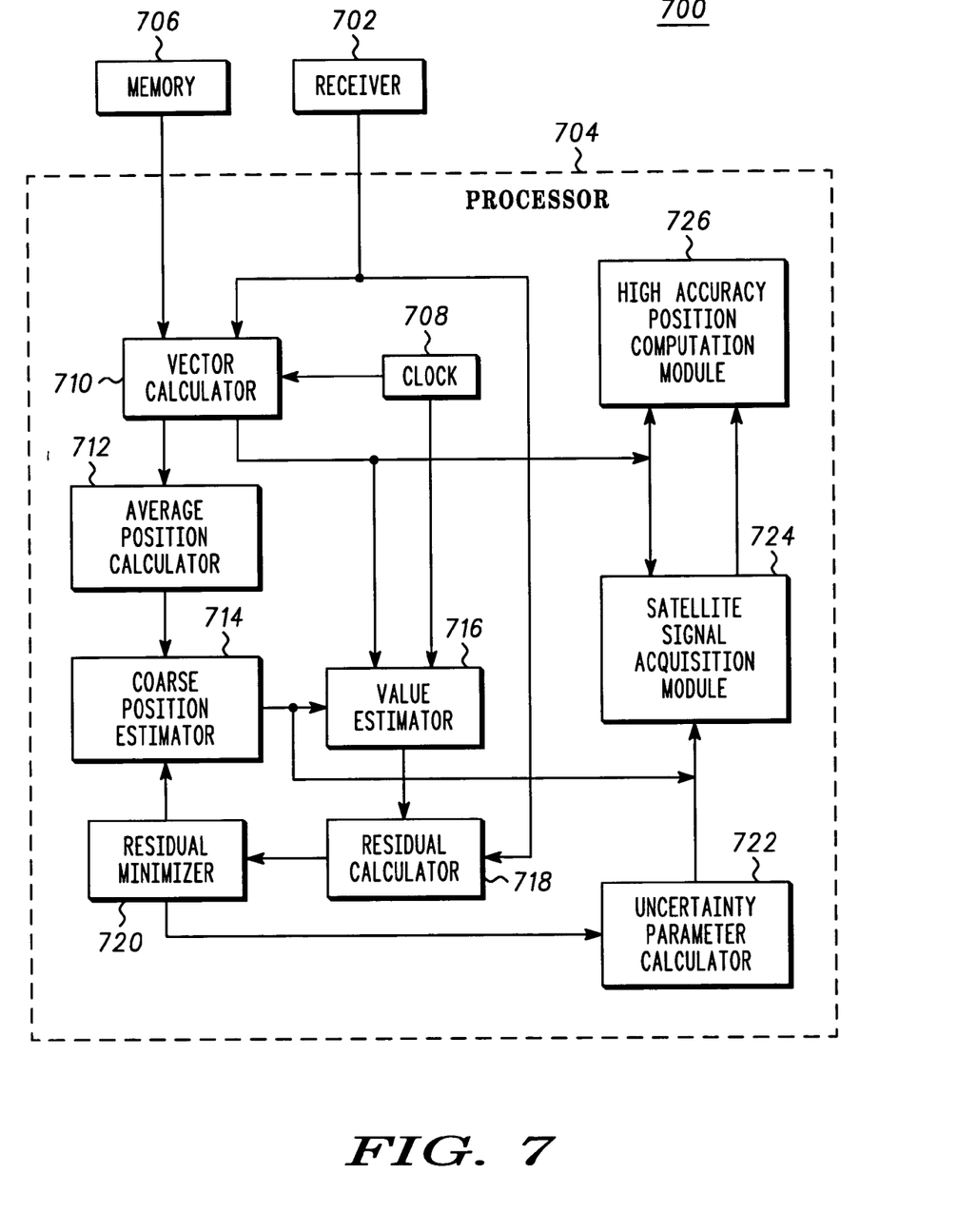
FIG. 7 is an exemplary block diagram of the third preferred embodiment in accordance with the present invention.

FIG. 7 illustrates an exemplary block diagram 700 of the third preferred embodiment of the present invention describing an apparatus for the wireless portable communication device 102. A receiver 702, which is configured to receive information about a plurality of satellites, is coupled to a processor 704, which is configured to calculate coarse position information of the wireless portable communication device 102 based upon the received information about the plurality of satellites. The received information about the plurality of satellites may be, but not limited to, Doppler assist data, rate-of-change of Doppler data, code phase assist data, elevation angle data, azimuth angle data, integer code phase, and GPS bit number, associated with at least three visible satellites. The coarse position information, which the processor 704 is configured to calculate, may be, but not limited to, a coarse position of the wireless portable communication device 102, and Doppler and code phase uncertainties associated with the coarse position. The wireless portable communication device 102 further comprises a memory 706 coupled to the processor 704. The memory 706 is configured to store orbital information of the plurality of satellites such as ephemeris data and almanac data of the plurality of satellites. The processor 704 may be further divided into several functional blocks. A clock 708, which may internally keep time, reference external time, or a combination of both, provides time information in determining the coarse position information of the wireless portable communication device 102. A vector calculator 710 receives identities of the visible satellites from the receiver 702, the ephemeris or almanac data from the memory 706, and the current time from the clock 708, and calculates position and velocity vectors of the visible satellites. An average position calculator 712 receives from the vector calculator 710 the position vectors of the visible satellites, and calculates a weighted sum of positions, such as a centroid, of the visible satellites. A coarse position estimator 714 receives from the average position calculator 712 the weighted sum of positions of the visible satellites, and calculates an estimated coarse position of the wireless portable communication device 102. A value estimator 716 receives the estimated coarse position from the coarse position estimator 714, the information about the visible satellites from the vector calculator 710 or from the receiver 702, and the current time from the clock 708, and calculates an estimate value consistent with the received information for each of the visible satellites. For example, if the receiver 702 had received Doppler assist data in block 204, then the value estimator 716 would calculate Doppler assist data for the visible satellites expected at the estimated coarse position received from the coarse position estimator 714. A residual calculator 718 receives the estimated values from the value estimator 716 and the corresponding values from the receiver 702, and calculates residuals based upon differences between the estimated values and corresponding values for the visible satellites. A residual minimizer 720 then varies the estimated coarse position according to a predetermined condition or based on a linearized least squares solution, causes the value estimator 716 to re-calculate the estimated values based upon the varied estimated coarse position, and causes the residual calculator 718 to re-calculate differences between the re-calculated estimated values and corresponding values for the visible satellites. The residual minimizer 720 then selects the varied estimated coarse position having the minimum residuals as the coarse position of the wireless portable communication device 102. An uncertainty parameter calculator 722 receives the coarse position of the wireless portable communication device 102 from the residual minimizer 720, and calculates uncertainty information such as Doppler uncertainties and code phase uncertainties expected at the coarse position. The determined approximate position from block 714 and the associated uncertainties from block 722 as well as the estimated satellite position and velocity data from 710, or the orbital information stored in memory 706, are then used by a satellite signal acquisition module 724 to acquire and measure actual satellite code phase and Doppler data, which are used for subsequent computation of high accuracy position calculation by a high accuracy position computation module 726.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a wireless portable communication device for determining an approximate position of the wireless communication device, the method comprising steps of:
receiving information about a plurality of satellites, said information comprising at least one of Doppler assist data, rate-of-change of Doppler data, code phase assist data, elevation angle data, azimuth angle data, integer code phase, or global positioning system bit number, associated with visible satellites of the plurality of satellites; and
calculating an initial position estimate based upon a current time for determining the approximate position of the wireless portable communication device based upon the information about the plurality of satellites wherein said calculating an initial position is performed within said wireless portable communication device without first receiving location information from a base station such that said initial position estimate is not based on an initial position information of said base station.

2. The method of claim 1, wherein the visible satellites comprise at least three visible satellites.

3. The method of claim 1, wherein the wireless portable communication device has orbital information of the plurality of satellites.

4. The method of claim 3, wherein the orbital information of the plurality of satellites comprises at least one of ephemeris data and almanac data of the plurality of satellites.

5. The method of claim 4, wherein the step of calculating the initial position estimate for determining the approximate position of the wireless portable communication device further comprises steps of:
determining the current time;
calculating position and velocity vectors of the visible satellites based upon the current time and the orbital information of the plurality of satellites;
calculating a weighted sum of positions of the visible satellites based upon the calculated position vectors of the visible satellites; and
estimating the initial position of the wireless portable communication device based upon the weighted sum of positions of the visible satellites.

6. The method of claim 5, wherein the step of determining the current time is based upon at least one of an internal real time clock of the wireless communication device and an over-the-air message.

7. The method of claim 5, wherein a weight applied to each calculated position vector in calculating the weighted sum of positions of the visible satellites is based upon an elevation angle of the visible satellite associated with the calculated position vector.

8. The method of claim 5, further comprising steps of:
calculating an estimate value consistent with the received information for each of the visible satellites based upon the estimated coarse position of the wireless portable communication device and at least one of the calculated velocity vectors and the calculated position vectors;
calculating a residual based upon a difference between the estimated value and corresponding value in the received information for each of the visible satellites; and
minimizing the residuals.

9. The method of claim 8, wherein minimizing the residuals further comprises steps of:
selecting a plurality of candidate coarse positions by varying the estimated coarse position according to a predetermined condition;
for each of the plurality of candidate coarse positions, re-calculating an estimate value consistent with the received information for each of the visible satellites based upon the candidate coarse position of the wireless portable communication device and at least one of the calculated velocity vectors and the calculated position vectors;
re-calculating a residual based upon a difference between the estimated value and corresponding value in the received information for each of the visible satellites; and
selecting the candidate coarse position having minimum residuals.

10. The method of claim 1, the method further comprising the step of:
calculating uncertainty parameters based upon the information about the plurality of satellites, said uncertainty parameters comprising at least one of Doppler uncertainties or code phase uncertainties for said wireless portable communication device.

11. The method of claim 10, wherein the visible satellites comprise at least three visible satellites.

12. The method of claim 10, wherein the wireless portable communication device has orbital information of the plurality of satellites.

13. The method of claim 12, wherein the orbital information of the plurality of satellites comprises at least one of ephemeris data and almanac data of the plurality of satellites.

14. The method of claim 13, wherein the step of calculating uncertainty parameters based upon the information about the plurality of satellites further comprises steps of:
determining the current time;
calculating position and velocity vectors of the visible satellites based upon the current time and the orbital information of the plurality of satellites;
calculating a weighted sum of positions of the visible satellites based upon the calculated position vectors of the visible satellites; and
estimating the initial position of the wireless portable communication device based upon the weighted sum of positions of the visible satellites.

15. The method of claim 13, wherein the step of determining current time is based upon at least one of an internal real time clock of the wireless communication device and an over-the-air message.

16. The method of claim 14, further comprising steps of:
calculating an estimate value consistent with the received information for each of the visible satellites based upon the estimated coarse position of the wireless portable communication device and at least one of the calculated velocity vectors and the calculated position vectors;
calculating a residual based upon a difference between the estimated value and corresponding value in the received information for each of the visible satellites; and
minimizing the residuals.

17. The method of claim 16, wherein minimizing the residuals further comprises steps of:
selecting a plurality of candidate coarse positions by varying the estimated coarse position according to a predetermined condition;
for each of the plurality of candidate coarse positions, re-calculating an estimate value consistent with the received information for each of the visible satellites based upon the candidate coarse position of the wireless portable communication device and at least one of the calculated velocity vectors and the calculated position vectors;
re-calculating a residual based upon a difference between the estimated value and corresponding value in the received information for each of the visible satellites; and
selecting the candidate coarse position having minimum residuals.

18. The method claim 17, further comprising a step of calculating the uncertainty parameters for the candidate coarse position having the minimum residuals.

19. A wireless portable communication device comprising:
a receiver configured to receive information about a plurality of satellites, said information comprising at least one of Doppler assist data, rate-of-change of Doppler data, code phase assist data, elevation angle data, azimuth angle data, integer code phase, or global positioning system bit number, associated with visible satellites;
a processor coupled to the receiver, the processor configured to calculate coarse position information of the wireless portable communication device based upon a current time and the information about the plurality of satellites, wherein said coarse position is calculated within said processor without first receiving location information from a base station such that said coarse position information is not based on an initial position information of said base station, the processor further comprising a clock configured to determine the current time; a vector calculator coupled to the clock, the receiver, and the memory, the vector calculator configured to calculate position and velocity vectors of the visible satellites based upon the current time and the orbital information of the plurality of satellites; an average position calculator coupled to the vector calculator, the average position calculator configured to calculate a weighted sum of an average positions of the visible satellites based upon the calculated position vectors of the visible satellites; and a coarse position estimator coupled to the average position calculator, the coarse position estimator configured to calculate an estimated coarse position of the wireless portable communication device based upon the weighted sum of positions of the visible satellites; and
a memory coupled to the processor, the memory configured to store orbital information of the plurality of satellites comprising at least one of ephemeris data and almanac data of the plurality of satellites.

20. The wireless portable communication device of claim 19, wherein the visible satellites comprise at least three visible satellites.

21. The wireless portable communication device of claim 19, wherein the clock further comprises at least one of an internal real time clock configured to provide the current time based upon internal tracked time and an external timer coupled to the receiver, the external timer configured to provide the current time from an over-the-air message received by the receiver.

22. The wireless portable communication device of claim 21, wherein the processor further comprises:
a value estimator coupled to the coarse position estimator, one of the vector calculator and the receiver, and the clock, the value estimator configured to calculate an estimate value consistent with the received information for each of the visible satellites based upon the estimated coarse position of the wireless portable communication device and at least one of the calculated velocity vectors and the calculated position vectors;
a residual calculator coupled to the value estimator and the receiver, the residual calculator configured to calculate residuals based upon differences between the estimated values and corresponding values in the received information about the visible satellites; and
a residual minimizer coupled to the coarse position estimator and the residual calculator, wherein the residual minimizer varies the estimated coarse position according to a predetermined condition, feeds the varied estimated value to the value estimator; and
selects the varied estimated coarse position having minimum residuals as a coarse position.

23. The wireless portable communication device of claim 22, wherein the processor further comprises an uncertainty parameter calculator coupled to the residual minimizer, the uncertainty parameter calculator configured to calculate at least one of Doppler uncertainties and code phase uncertainties based upon the coarse position.

24. The wireless portable communication device of claim 23, further comprising:
a satellite signal acquisition module coupled to the vector calculator, the coarse position estimator, and the uncertainty parameter calculator, the satellite signal acquisition module configured to acquire measurements of code phase and Doppler using the determined coarse position and the stored orbital information of the plurality of satellites.

25. The wireless portable communication device of claim 24, further comprising a high accuracy position computation module coupled to the satellite signal acquisition module and the vector calculator, the high accuracy position computation module configured to compute an accurate position of the wireless portable communication device based upon the measurements acquired by the satellite signal acquisition module.

* * * * *